US012713013B2

(12) United States Patent
Yu et al.

(10) Patent No.: US 12,713,013 B2
(45) Date of Patent: Aug. 18, 2026

(54) LOOP FILTERING METHOD

(71) Applicant: Alibaba (China) Co., Ltd., Hangzhou (CN)

(72) Inventors: Liangwei Yu, Hangzhou (CN); Jianhua Chen, Hangzhou (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 337 days.

(21) Appl. No.: 18/601,153

(22) Filed: Mar. 11, 2024

(65) Prior Publication Data

US 2024/0323369 A1 Sep. 26, 2024

(30) Foreign Application Priority Data

Mar. 20, 2023 (CN) ........................ 202310286977.3

(51) Int. Cl.
*H04N 19/117* (2014.01)
*H04N 19/105* (2014.01)
*H04N 19/14* (2014.01)
*H04N 19/176* (2014.01)
*H04N 19/82* (2014.01)

(52) U.S. Cl.
CPC ......... *H04N 19/117* (2014.11); *H04N 19/105* (2014.11); *H04N 19/14* (2014.11); *H04N 19/176* (2014.11); *H04N 19/82* (2014.11)

(58) Field of Classification Search
CPC .... H04N 19/117; H04N 19/105; H04N 19/14; H04N 19/176; H04N 19/82
See application file for complete search history.

(56) References Cited

U.S. PATENT DOCUMENTS

2006/0294171 A1* 12/2006 Bossen .................. H04N 19/59
375/E7.176
2018/0061014 A1* 3/2018 Guo .......................... G06T 5/70
(Continued)

FOREIGN PATENT DOCUMENTS

CA 2811376 A1 * 4/2012 ............. H04N 19/17
CN 102124739 A 7/2011
(Continued)

OTHER PUBLICATIONS

Office Action issued in corresponding Chinese Application No. 202310286977.3 on Jul. 26, 2025, (6 pages).

*Primary Examiner* — Dave Czekaj
*Assistant Examiner* — Shanika M Brumfield
(74) *Attorney, Agent, or Firm* — Finnegan, Henderson, Farabow, Garrett & Dunner, LLP

(57) ABSTRACT

Embodiments of the present disclosure provide a loop filtering method, including: determining a reference image block corresponding to a to-be-processed image block in an adjacent reference frame in a time domain, and predicting the loop filtering enabling probability of the to-be-processed image block based on the result of loop filtering of the reference image block; determining spatial coding information of the to-be-processed image block, the spatial coding information being used to characterize texture complexity of the to-be-processed image block; and making a loop filtering decision for the to-be-processed image block in response to the spatial coding information and the loop filtering enabling probability meeting preset filtering conditions.

18 Claims, 11 Drawing Sheets

(56) References Cited

U.S. PATENT DOCUMENTS

| | | | | |
|---|---|---|---|---|
| 2018/0184086 | A1* | 6/2018 | Mukherjee | H04N 19/105 |
| 2021/0021841 | A1* | 1/2021 | Xu | H04N 19/157 |
| 2023/0388490 | A1* | 11/2023 | Liu | H04N 19/105 |
| 2025/0030899 | A1* | 1/2025 | Yan | H04N 19/70 |

FOREIGN PATENT DOCUMENTS

| | | | | |
|---|---|---|---|---|
| CN | 107852490 | A | 3/2018 | |
| CN | 109219958 | A | 1/2019 | |
| CN | 114205582 | A | 3/2022 | |
| CN | 114868392 | A | 8/2022 | |
| WO | WO-2009131508 | A2 * | 10/2009 | H04N 19/523 |

* cited by examiner

LOOP FILTERING METHOD

CROSS-REFERENCE TO RELATED APPLICATIONS

The disclosure claims the benefits of priority to Chinese Application No. 202310286977.3, filed on Mar. 20, 2023, which is incorporated herein by reference in its entirety.

TECHNICAL FIELD

Embodiments of the present disclosure relate to the field of image processing, and in particular to a loop filtering method, an encoding method, a decoding method, an electronic device, a storage medium and a program product.

BACKGROUND OF THE DISCLOSURE

In the field of video coding technology, in order to reduce compression distortion, adaptive loop filtering is generally performed on video frames to improve compression efficiency and reconstruction quality.

Generally, when adaptive loop filtering is performed, first, covariance information is statistically calculated for several to-be-processed image blocks based on a result of current decision of whether to perform loop filtering on the image blocks, and the filtering coefficient group is determined for the several image blocks based on the result of statistical calculating of covariance. The result of decision of loop filtering for the image blocks is updated based on the filtering coefficient group through Rate-Distortion Optimization (RDO) decision, and then the step of statistical calculating of covariance information is repeated based on the result of decision of loop filtering for multiple iterations. Based on the results of multiple iterations, the final result of decision of loop filtering of the image blocks and the filtering coefficient group can be obtained.

However, in the above process, it is necessary to calculate the filtering coefficient group and update the result of the decision of loop filtering of the image blocks multiple times, resulting in high computation complexity.

SUMMARY

The disclosed embodiments of the present disclosure provide a loop filtering solution to at least partially solve the above problems.

According to some embodiments of the present disclosure, a loop filtering method is provided, including: determining a reference image block corresponding to a to-be-processed image block in an adjacent reference frame in a time domain, and predicting a loop filtering enabling probability of the to-be-processed image block based on a result of loop filtering of the reference image block; determining spatial coding information of the to-be-processed image block, the spatial coding information being used to characterize texture complexity of the to-be-processed image block; and making a loop filtering decision for the to-be-processed image block in response to the spatial coding information and the loop filtering enabling probability meeting preset filtering conditions.

In some embodiments of the present disclosure, making the loop filtering decision for the to-be-processed image block includes in response to the spatial coding information and the loop filtering enabling probability meeting preset filtering conditions: updating the loop filtering enabling probability based on the spatial coding information; making the loop filtering decision for the to-be-processed image block in response to the updated loop filtering enabling probability meeting a preset probability condition; or determining not to perform loop filtering on the to-be-processed image block in response to the updated loop filtering enabling probability does not meet the preset probability condition.

In some embodiments of the present disclosure, updating the loop filtering enabling probability based on the spatial coding information includes: updating the loop filtering enabling probability based on a time domain level of a video frame where the to-be-processed image block is located and the spatial coding information.

In some embodiments of the present disclosure, updating the loop filtering enabling probability based on the spatial coding information includes: inputting the spatial coding information and the loop filtering enabling probability to a pre-trained machine learning model, and outputting the updated loop filtering enabling probability through the machine learning model.

In some embodiments of the present disclosure, the spatial coding information includes at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, and image gradient information of the reference block adjacent to the to-be-processed image block in the space domain.

In some embodiments of the present disclosure, if the spatial coding information includes at least two types, then updating the loop filtering enabling probability based on the spatial coding information includes: performing cascade comparison based on preset parameter thresholds corresponding to the at least two types of spatial coding information; and updating the loop filtering enabling probability based on the result of cascade comparison.

According to some embodiments of the present disclosure, an encoding method is provided, including: determining a reference image block corresponding to a to-be-processed image block in an adjacent reference frame in a time domain, and predicting a loop filtering enabling probability of the to-be-processed image block based on a result of loop filtering of the reference image block; determining spatial coding information of the to-be-processed image block, the spatial coding information being used to characterize texture complexity of the to-be-processed image block; and if the spatial coding information and the loop filtering enabling probability meet preset filtering conditions, making a loop filtering decision for the to-be-processed image block; according to the result of loop filtering decision, performing loop filtering on the to-be-processed image block or not performing loop filtering on the to-be-processed image block, to obtain an output image block; and encoding based on the output image block to obtain a code stream carrying a loop filtering identifier.

According to some embodiments of the present disclosure, a decoding method is provided, including: decoding a code stream and reconstructing a video frame to obtain a reconstructed block to be processed; and performing loop filtering on the reconstructed block based on the loop filtering identifier carried in the code stream, where the loop filtering identifier is determined by any of the encoding methods herein.

According to some embodiments of the present disclosure, an electronic device is provided, including: one or more processors, a memory, a communication interface, and a communication bus. The one or more processors, the memory, and the communication interface communicate with each other via the communication bus. The memory is configured to store that are executable by the one or more processors to cause the electronic device to perform operations corresponding to any of the above methods.

According to some embodiments of the present disclosure, a non-transitory computer-readable storage medium is provided, storing instructions that are executable by one or more processors of a device to cause the device to perform operations corresponding to any of the above methods for loop filtering.

BRIEF DESCRIPTION OF THE DRAWINGS

The accompanying drawings described herein are used for providing a further understanding of the present disclosure, and forming a part of the present disclosure. Exemplary examples of the present disclosure and descriptions thereof are used for explaining the present disclosure, but do not constitute any inappropriate limitation to the present disclosure. In the accompanying drawings.

DETAILED DESCRIPTION

Figure 1:
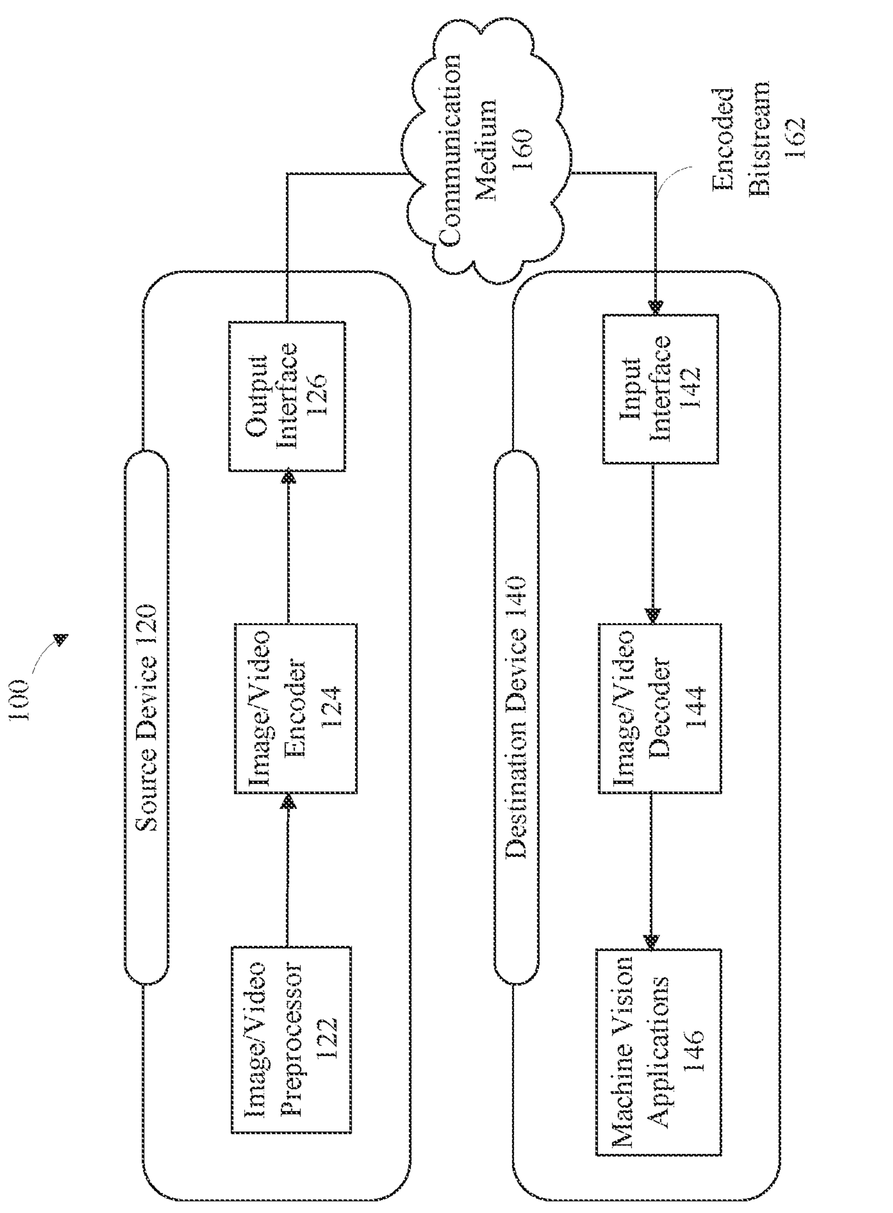
FIG. 1 is a schematic diagram illustrating an exemplary system for preprocessing and coding image data, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

According to some embodiments of the present disclosure, the spatial coding information can be used to characterize the texture complexity of the to-be-processed image block, and the loop filtering enabling probability obtained through the result of loop filtering of the reference image block in the time domain can be used to characterize the time domain filtering information of the image to be processed. By determining whether to make a loop filtering decision on the image to be processed through time domain information in combination with spatial information, the accuracy of the decision result can be improved. In addition, by setting the preset filtering conditions corresponding to the spatial coding information and the loop filtering enabling probability, some to-be-processed image blocks that don't need loop filtering can be filtered out based on the preset filtering conditions, thus reducing the computation complexity.

The present disclosure is directed to Video Coding for Machines (VCM), which aims at compressing input videos and images or feature maps for machine vision tasks. Specifically, according to exemplary embodiments, prior to encoding, an input picture is pre-analyzed to detect segment masks that correspond to objects or foregrounds in the input picture. The segment masks are further pre-processed to form a merged mask, which is then encoded (i.e., compressed). In some embodiments, the pre-processing may also identify an extended region surrounding the merged mask. The extended region is also compressed by the encoder.

Consistent with the disclosed embodiment, the pre-analysis and pre-processing may be performed by an image data pre-processor separate from the encoder. Alternatively, the pre-analysis may be performed by the encoder itself. The present disclosure does not limit the hardware or software architecture for implementing the image data pre-analysis.

The disclosed techniques are suitable for compressing image data used by any machine vision tasks, such as object recognition and tracking, face recognition, image/video search, mobile augmented reality (MAR), autonomous vehicles, Internet of Things (IoT), images matching, 3-dimension structure construction, stereo correspondence, motion tracking, etc.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
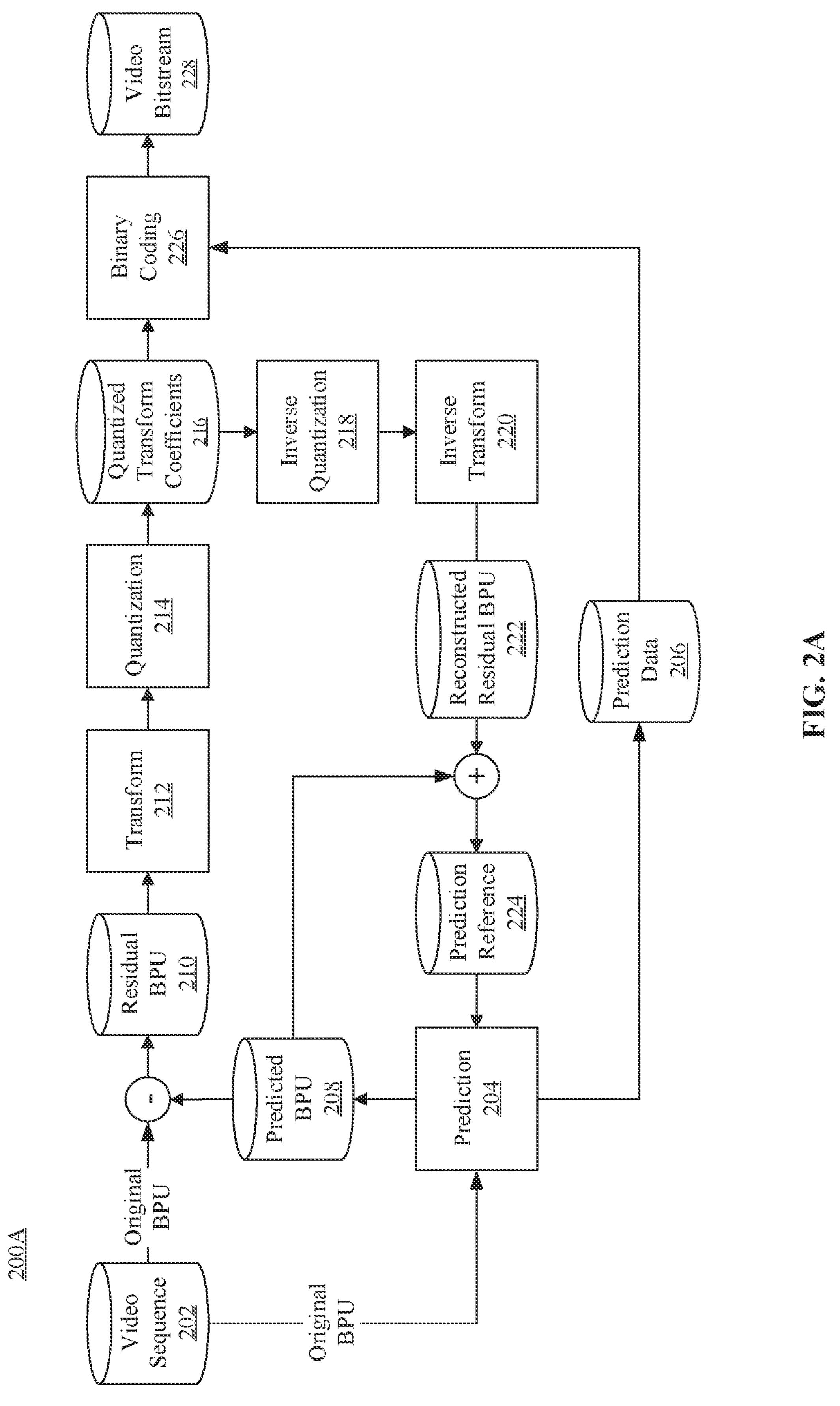
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
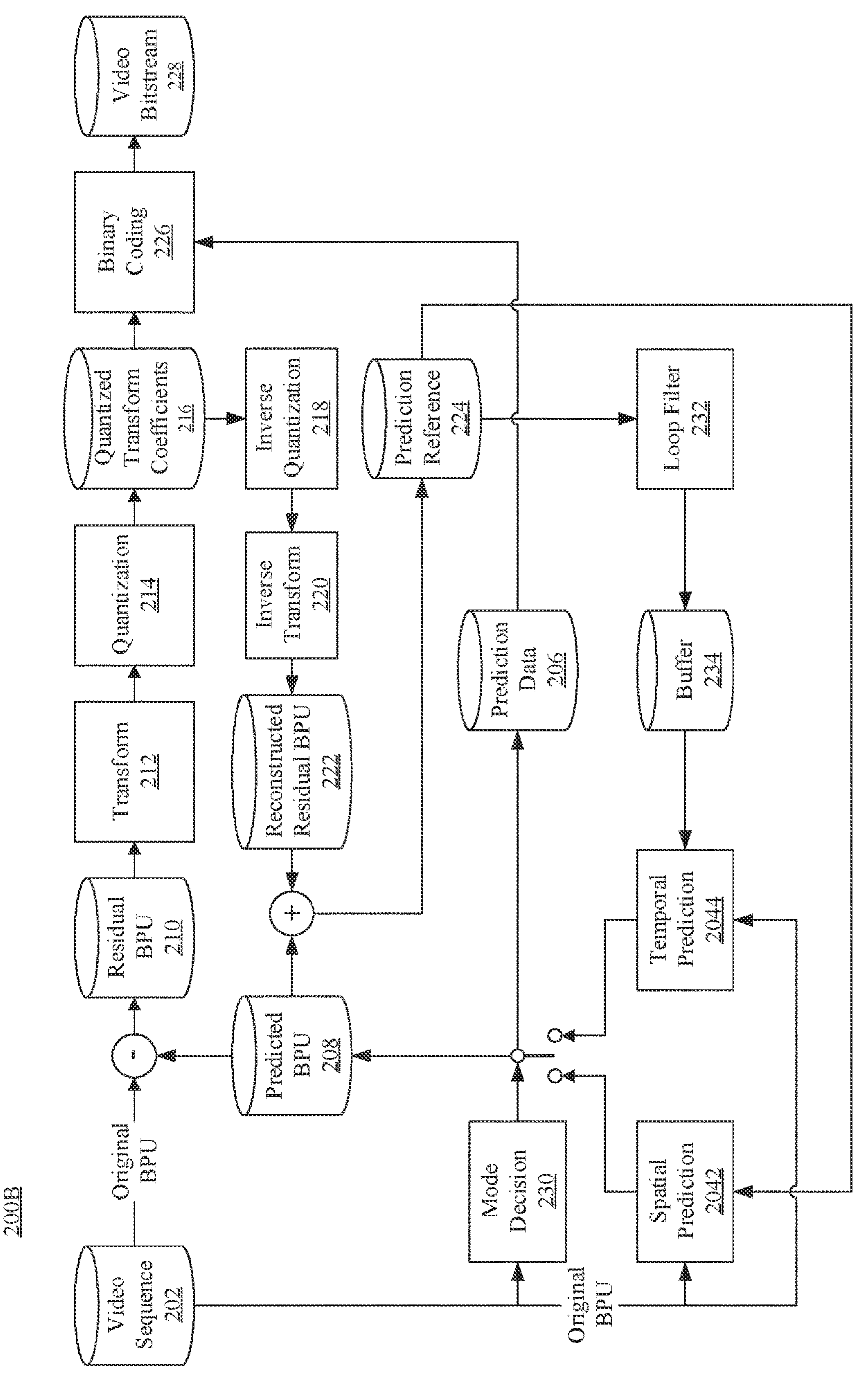
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
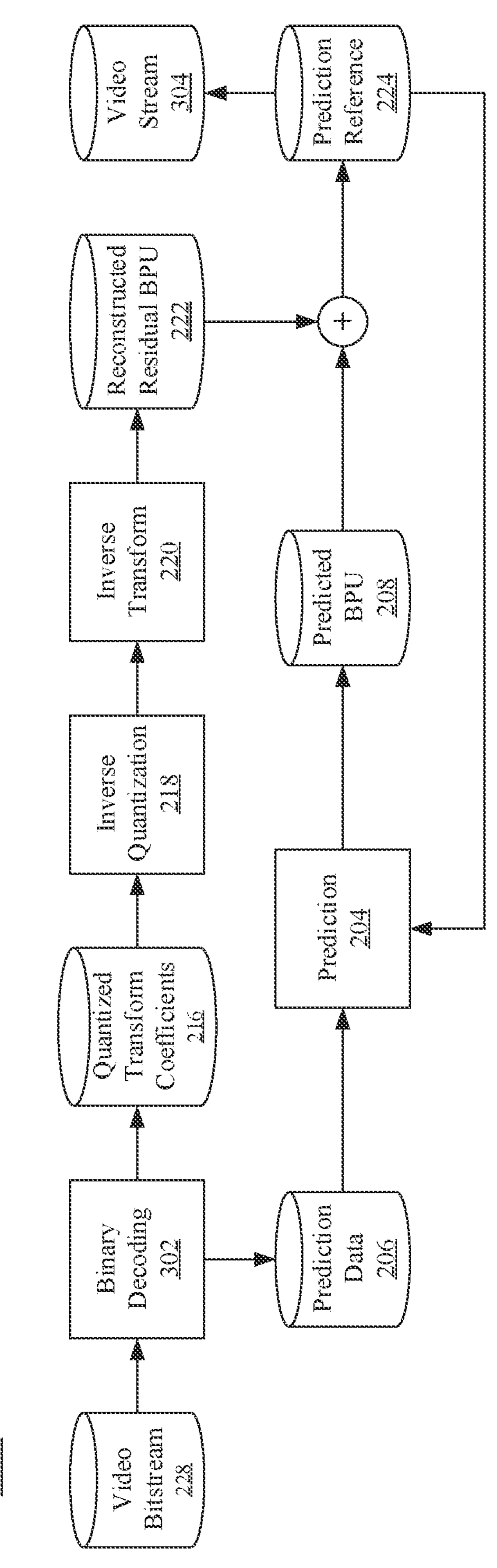
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
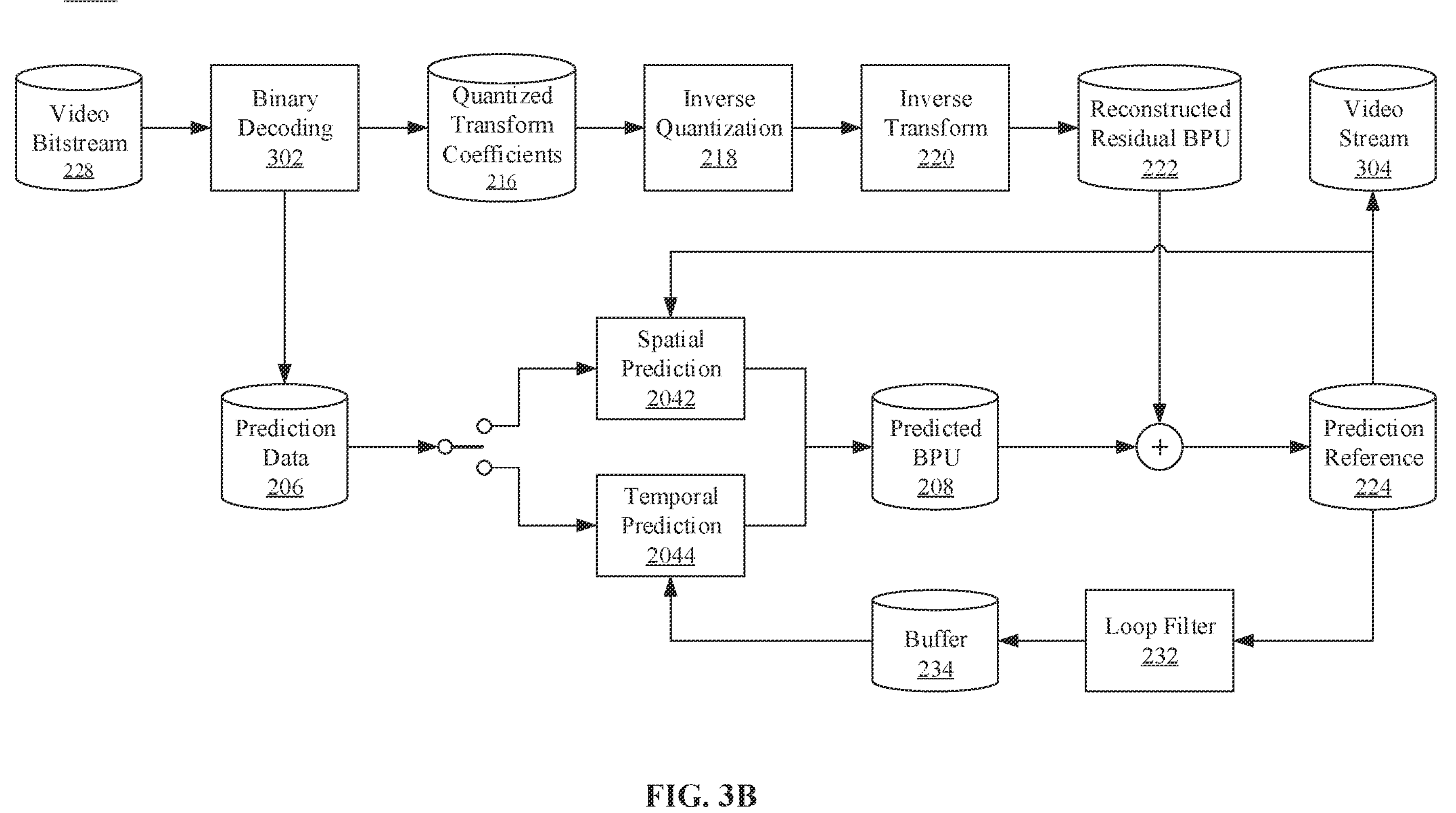
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
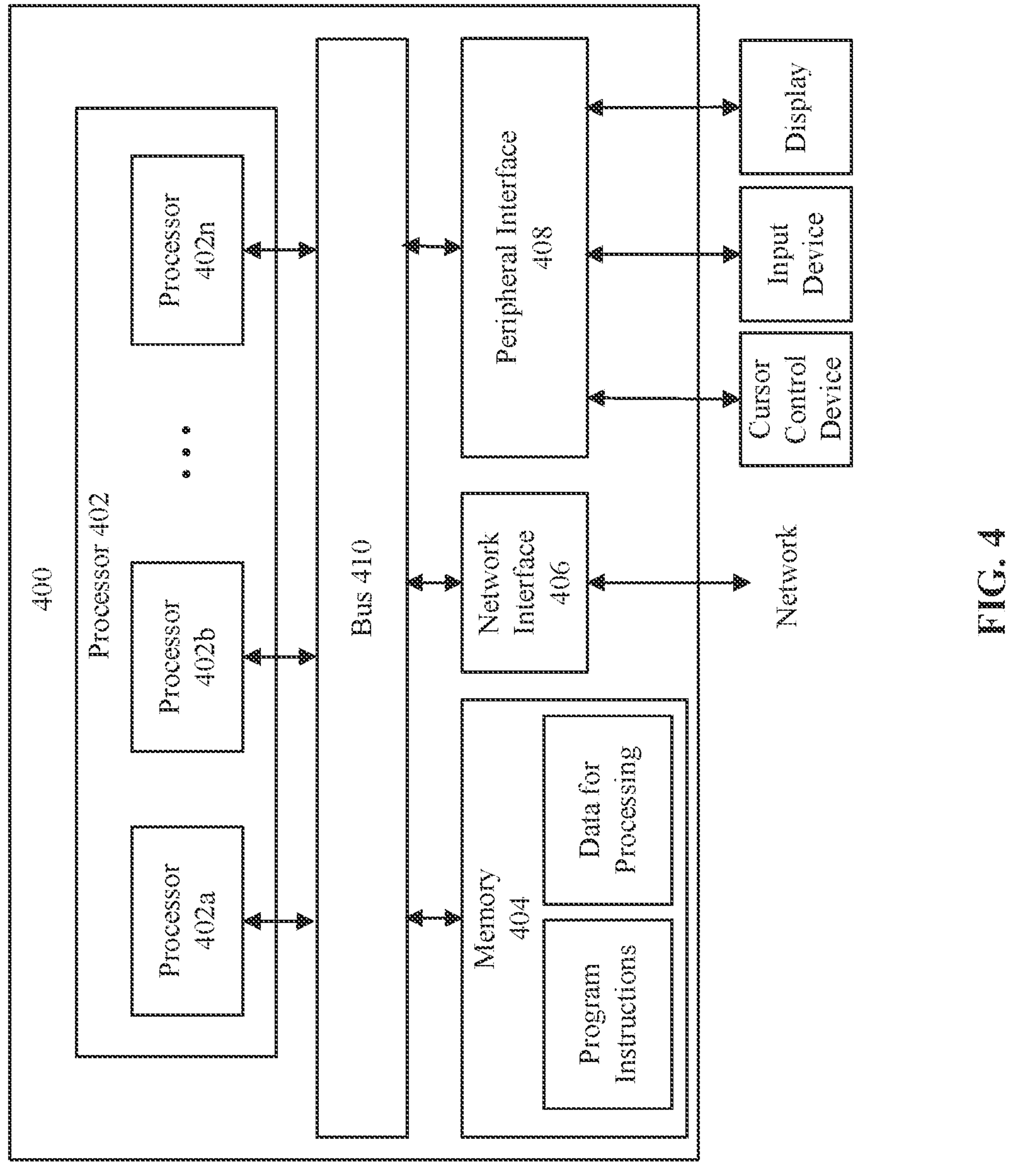
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
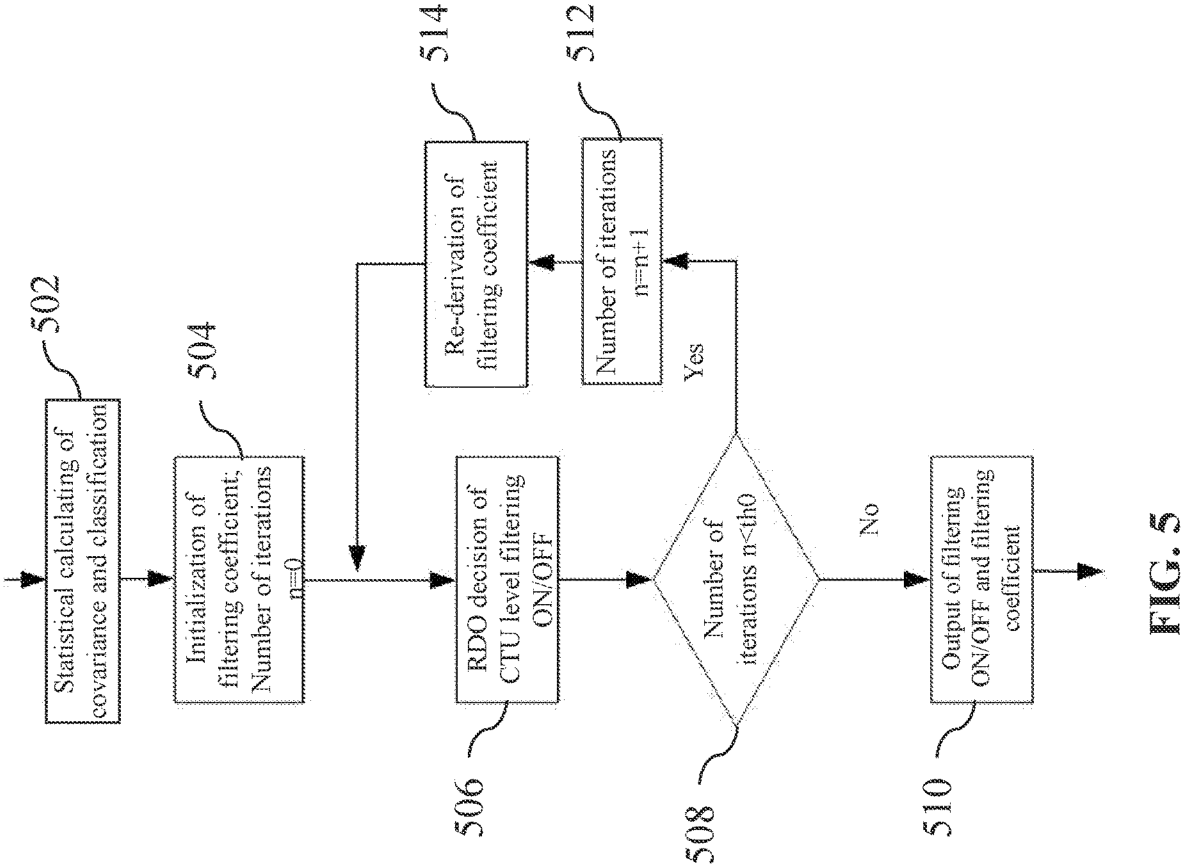
FIG. 5 is a schematic flow chart of making a loop filtering decision in an exemplary circumstance, according to some embodiments of the present disclosure.

FIG. 5 is a schematic flow chart of making a loop filtering decision in an exemplary circumstance, according to some embodiments of the present disclosure. As shown in FIG. 5, taking the encoding process as an example, the process of making a loop filtering decision may include the following steps 502 to 514, which can be implemented by an encoder (e.g., image/video encoder 124 in FIG. 1 or apparatus 400 in FIG. 4).

The encoder conducts statistical calculation for covariance and classification in step 502. The covariance of multiple image groups (Coding Tree Units, CTUs) and the ALF (Adaptive Loop Filtering) category of the smallest image block CU in the CTU can be statistically calculated in step 502.

The encoder initializes filtering coefficients in step 504. For example, based on the covariance of multiple CTUs and the category of the smallest image block CU, the initial ALF filtering coefficient group of the CTUs is derived by the encoder. At this time, the number of iterations is 0.

The encoder makes an RDO decision of CTU-level filtering in step 506. For example, based on the ALF filtering coefficient group, it can be decided through RDO whether to enable ALF for each CTU by the encoder.

The encoder determines whether the number of iterations reaches a predetermined threshold th0 in step 508. If it does not reach th0, the process goes to step 512. If it reaches th0, the process goes to step 510.

At steps 512 and 514, when the number of iterations does not reach the predetermined threshold, the encoder increases the number of iterations by one (step 512) and re-derives filtering coefficients (step 514).

According to the determination of "whether to enable ALF" updated in step 506, the covariance of the CTU for which the ALF filtering is enabled is statistically re-calculated, and the ALF filtering coefficient group is re-derived based on the statistical information statistically obtained.

After step 514 is completed, the process returns to step 506 to continue with execution.

At step 510, when the number of iterations reaches the predetermined threshold, the encoder outputs an ALF filtering decision for each CTU and the final ALF filtering coefficient group. The ALF filtering decision can be used to characterize whether loop filtering is to be performed on the CTU, and the ALF filtering coefficient group can be used as a parameter of the loop filtering.

However, among the above steps, steps 506, 508, 512, and 514 can be cycled multiple times for each CTU, resulting in high computation complexity. In addition, although not each of the CTUs having the corresponding final ALF filtering decision being to enable ALF, in order to perform the RDO decision in the third step above, it is necessary to statistically calculate the covariance of each CUT and the ALF category of the smallest image block CU in the CTU, which is an additional amount of redundant computation.

In view of this, in order to reduce the computation complexity, some embodiments of the present disclosure provide another loop filtering solution.

Figure 6:
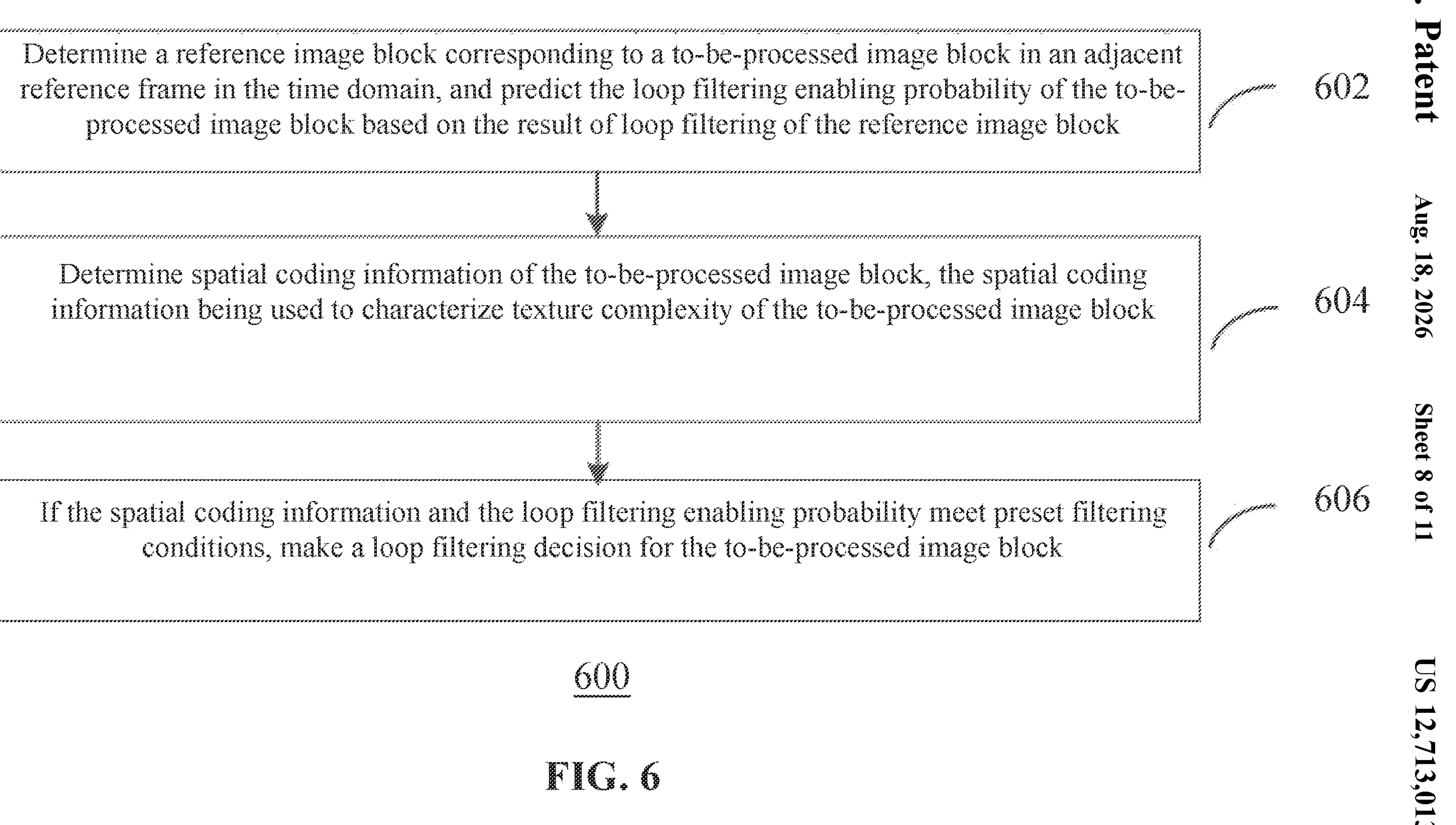
FIG. 6 is a flow chart illustrating steps of an exemplary loop filtering method according to some embodiments of the present disclosure.

FIG. 6 is a flow chart illustrating steps of an exemplary loop filtering method 600 according to some embodiments of the present disclosure. Specifically, loop filtering method 600 provided in some embodiments may include the following steps 602 to 606, which can be implemented by an encoder (e.g., image/video encoder 124 in FIG. 1 or apparatus 400 in FIG. 4).

In step 602, the encoder determines a reference image block corresponding to the to-be-processed image block in the adjacent reference frame in the time domain, and predicts a loop filtering enabling probability of the to-be-processed image block based on a result of loop filtering of the reference image block.

The to-be-processed image block can be any image block that needs loop filtering during the image encoding and decoding processes, which is not limited herein. The to-be-processed image block may be an image block belonging to bottom layers, or may be an image group including multiple bottom layer image blocks, which is not limited herein.

Since the video includes several video frames that exist in time sequence, the video frame where the to-be-processed image block is located has adjacent reference frames in the time domain. The reference frame can be the prior n frames and subsequent n frames to the video frame on the timeline, where n can be defined according to their own needs, and is not limited herein.

In some embodiments, the image block in the reference frame with a texture similarity to the to-be-processed image block greater than the threshold can be used as the reference image block of the to-be-processed image. In some embodiments, the image block in the reference frame that has the same position as the to-be-processed image can be used as the reference image block of the to-be-processed image block. For the specific criteria for determining the reference image block, reference may be made to the some other embodiments described herein, which is not described again here.

After the reference image block is determined, the loop filtering enabling probability of the to-be-processed image block can be predicted based on the result of loop filtering of the reference image block.

Specifically, the number of reference image blocks that have been subjected to loop filtering and the number of those that have not been subjected to loop filtering can be statistically counted to determine the loop filtering enabling probability of the to-be-processed image block. For example, the percentage of the number of those that have been subjected to loop filtering in the total number can be determined as the loop filtering enabling probability of the to-be-processed image block.

Furthermore, the loop filtering enabling probability of the to-be-processed image block can also be determined in conjunction with the distance between the reference image block and the to-be-processed image block in the timeline. For example, the weight of the reference image block can be determined based on the distance between the reference image block and the to-be-processed image block in the timeline, and the result of loop filtering of the reference image block can be weighted and summed to obtain the loop filtering enabling probability of the to-be-processed image block.

The loop filtering enabling probability is used to characterize the probability of performing loop filtering on the to-be-processed image block.

In addition, in some embodiments, when calculating the loop filtering enabling probability based on the result of loop filtering of the reference image block, the calculation can also be performed in conjunction with the rate distortion loss value RDCost prior and subsequent to ALF filtering.

Specifically, the difference between the RDCosts prior and subsequent to ALF filtering of the video frame can be accumulated, and the RDCost difference is mapped to a percentage impact factor according to preset mapping relationship. Once the loop filtering enabling probability is calculated based on the result of loop filtering of the reference image block, the percentage impact factor and the loop filtering enabling probability can be used as the finally calculated loop filtering enabling probability. Thus, the results of ALF filtering on the video frame can be further accumulated, thereby improving the accuracy of the calculated loop filtering enabling probability.

In some embodiment, the filtering RDO decision of a frame with a small accumulated RDCost difference is skipped based on the preset threshold. On the one hand, this solution only considers frame-level filtering decision and does not predictively skip CTU-level filtering in a more refined manner, resulting in large coding performance loss and the inability to omit redundant covariance calculation. On the other hand, this solution simply considers the time domain statistical characteristics of the filtering decision and ignores the spatial characteristics of the current frame, so that the prediction of the filtering decision is not accurate enough.

In step 604, the encoder determines the spatial coding information of the to-be-processed image block. The spatial coding information is used to characterize the texture complexity of the to-be-processed image block.

In some embodiments, the spatial coding information is the coding information of the to-be-processed image block in the space. The spatial coding information can be any information that can characterize the texture complexity of the to-be-processed image block, which is not limited herein.

In some embodiments, the spatial coding information may include at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in the space domain, or image gradient information of the reference block adjacent to the to-be-processed image block in the space domain.

The division depth of the to-be-processed image block is used to characterize the minimum image block size in coding of the to-be-processed image block. The greater the division depth, the smaller the minimum image block, and the higher the texture complexity.

As described above, VVC is based on image blocks. When using VVC as a standard for video coding, an image frame is generally divided into multiple image blocks. Specifically, the image blocks may be, for example, Coding Tree Units (CTUs). Afterwards, the image blocks can be divided in the form of a quadtree to obtain the first layer of leaf nodes, and the first layer of leaf nodes can be further divided to obtain multi layers of leaf nodes. Each layer of leaf nodes can correspond to one layer of depth. After multiple divisions, the bottom layer of leaf nodes can be obtained, namely the Coding Units (CUs). After the CUs are obtained through division, intra-frame prediction or inter-frame prediction can be performed on the CU to obtain the residual, and coding is performed based on the residual. The to-be-processed image block in some embodiments may be a CTU, and the level corresponding to the bottom layer of leaf nodes CUs divided from the CTU is the division depth of the CTU.

The coding bit number of the to-be-processed image block refers to the number of bits that the to-be-processed image block is represent by after the to-be-processed image block is compressed and encoded. Thus, the higher the texture complexity, the greater the coding bit number.

The boundary strength information of the to-be-processed image block is used to indicate the strength of the boundary in the to-be-processed image block. The higher the texture complexity, the higher the strength of the boundary.

The image gradient information of the to-be-processed image block is used to indicate the image gradient of the to-be-processed image block. The higher the texture complexity, the higher the image gradient.

The boundary strength information of the reference block adjacent to the to-be-processed image block in the space domain can be the boundary strength information of another image block adjacent to the to-be-processed image block in the image frame. The higher the boundary strength of the other image block, the higher the texture complexity of the to-be-processed image block.

The image gradient information of the reference block adjacent to the to-be-processed image block in the space domain can be the image gradient information of another image block adjacent in position to the to-be-processed image block in the image frame. The higher the image gradient of the other image block, the higher the texture complexity of the to-be-processed image block.

In step 606, the encoder makes the loop filtering decision for the to-be-processed image block if the spatial coding information and the loop filtering enabling probability meet preset filtering conditions.

When performing loop filtering, loop filtering is preferentially performed on a to-be-processed image block having a high loop filtering enabling probability or a high image texture complexity characterized by the spatial coding information. Therefore, preset filtering conditions can be set according to this principle, so that some to-be-processed image blocks that do not need loop filtering are filtered out through preset filtering conditions.

The specifics of the preset filtering conditions can be determined according to needs, and are not limited herein.

In some embodiments, step 606 may include the following sub-steps, which can be implemented by the encoder: updating the loop filtering enabling probability based on the spatial coding information; and making a loop filtering decision on the to-be-processed image block in response to the updated loop filtering enabling probability meeting a preset probability condition. The method further includes: determining not to perform loop filtering on the to-be-processed image block in response to the updated loop filtering enabling probability does not meet the preset probability condition.

In some embodiments, by updating the loop filtering enabling probability based on the spatial coding information, the updated loop filtering enabling probability is enabled to characterize both time domain information and spatial information. Therefore, the preset filtering condition can be the preset probability condition, which greatly reduces the complexity of the preset filtering condition and improves processing efficiency.

In some embodiments of the present disclosure, the spatial coding information and the loop filtering enabling probability can be input into the pre-trained machine learning model, and the updated loop filtering enabling probability can be output by the machine learning model. By updating the loop filtering enabling probability through the pre-trained machine learning model, it is unnecessary to set up a complex determination logic, and the accuracy of the updated loop filtering enabling probability can be improved. That is, the updated loop filtering enabling probability is enabled to characterize the probability of performing loop filtering on the to-be-processed image block more accurately.

In some embodiments of the present disclosure, if the spatial coding information includes at least two types, then cascade comparison can be performed based on the preset parameter thresholds corresponding to the at least two types of spatial coding information. The loop filtering enabling probability is updated based on the result of cascade comparison. By setting multi-level comparison conditions, the loop filtering enabling probability can be quickly updated, thereby improving the processing speed.

For example, the first level may correspond to the first spatial coding information with a corresponding first threshold. By comparing the size of the first spatial coding information with the first threshold, if it is less than the first threshold, then the loop filtering enabling probability can be set to zero; otherwise, continue to the next level of determination.

The second level may correspond to the second spatial coding information with a corresponding second threshold. By comparing the size of the second spatial coding information and the second threshold, if it is less than the second threshold, then continue to the next level of determination, through which the loop filtering enabling probability is set to zero or kept unchanged; otherwise, continue to the next level of determination, through which the loop filtering is kept unchanged or set to one.

In some embodiments, the loop filtering enabling probability can also be updated based on the time domain level of the video frame where the to-be-processed image block is located and spatial coding information.

The time domain level of the video frame where the to-be-processed image block is located is used to characterize the time domain level where the image frame is located. Specifically, the H.264 SVC standard achieves time domain scalability by setting discardable reference frames in the GOP (Group of Coded Pictures). Layer 0 can be encoded and decoded independently. The first layer relies on layer 0 for encoding and decoding, and the second layer relies on the first layer for encoding and decoding. The decoding results of high-level video frames will not affect the decoding of low-level video frames. The greater the number of the decoded layers, the higher the obtained frame rate of the decoded video. Since the decoding results of high-level video frames will not affect the decoding of low-level video frames, the quality of high-level decoding can be lower, and the probability of performing loop filtering can also be lower. By introducing the time domain level, it is possible to skip the loop filtering decision on the to-be-processed image blocks at the high-level time domain level as much as possible, thus improving the processing speed.

When the loop filtering enabling probability is updated through cascade comparison, the temporal level can also correspond to one level. For example, the level threshold corresponding to the temporal level can be set, and it can be determined whether the time domain level of the to-be-processed image block is less than the level threshold. If it is less than the level threshold, then continue to the next level of comparison and the loop filtering enabling probability is set to zero or kept unchanged based on the result of next level of comparison; and if it is greater than the level threshold, then continue to the next level of comparison and the loop filtering enabling probability is kept unchanged or set to one based on the result of next level of comparison.

According to some embodiments of the present disclosure, the spatial coding information can be used to characterize the texture complexity of the to-be-processed image block, and the loop filtering enabling probability obtained through the result of loop filtering of the reference image block in the time domain can be used to characterize the time domain filtering information of the image to be processed. By determining whether to make a loop filtering decision on the image to be processed through time domain information in combination with spatial information, the accuracy of the decision result can be improved. In addition, by setting the preset filtering conditions corresponding to the spatial coding information and the loop filtering enabling probability, some to-be-processed image blocks that don't need loop filtering can be filtered out based on the preset filtering conditions, thus reducing the computation complexity.

Figure 7:
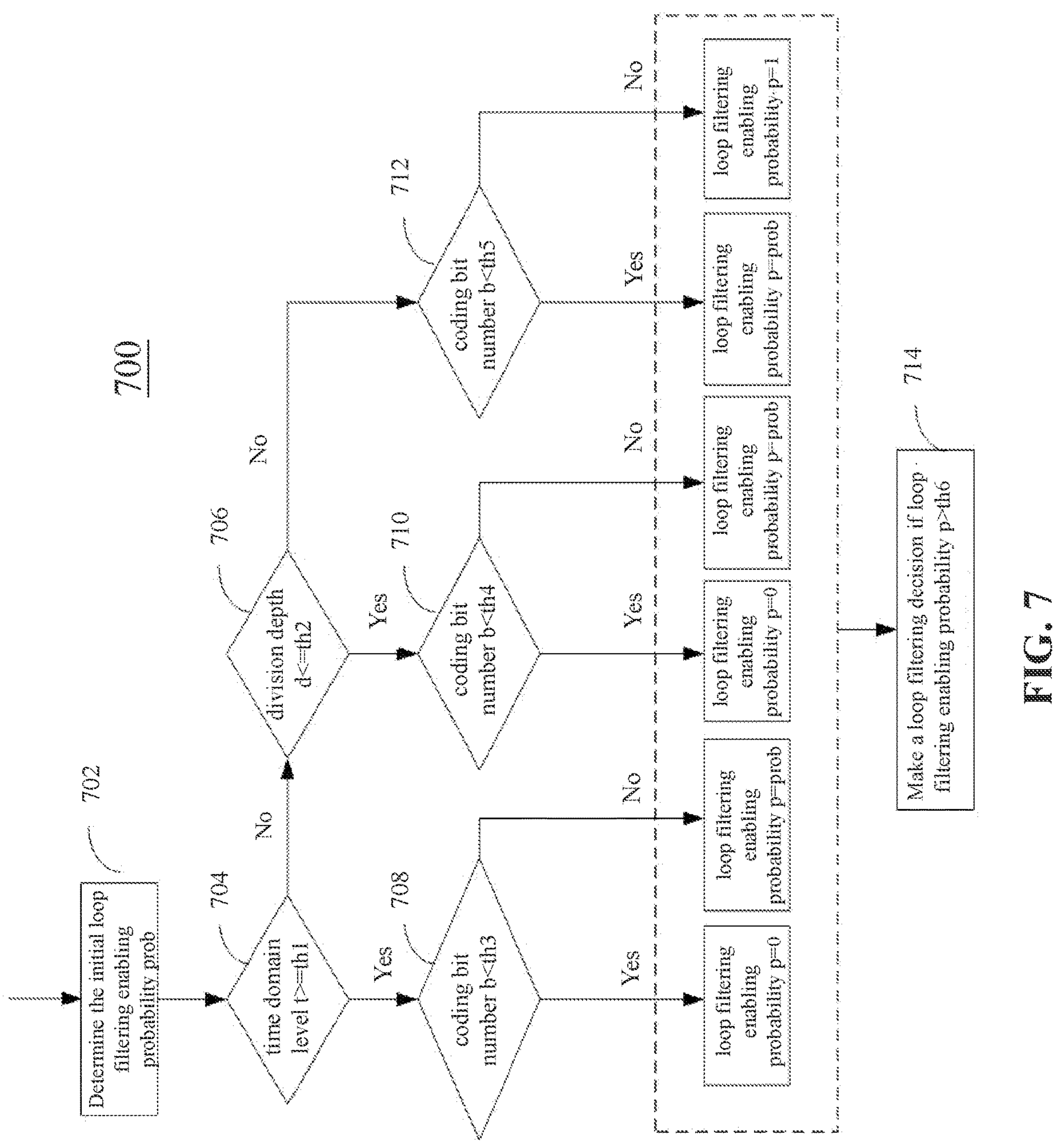
FIG. 7 is a schematic diagram illustrating a usage scenario of an exemplary loop filtering method according to some embodiments of the present disclosure.

FIG. 7 is a schematic diagram illustrating a usage scenario of an exemplary loop filtering method 700 according to some embodiments of the present disclosure. Specifically, loop filtering method 700 may include the following steps 702 to 714, which can be implemented by an encoder (e.g., image/video encoder 124 in FIG. 1 or apparatus 400 in FIG. 4).

In step 702, the encoder determines the reference image block corresponding to the to-be-processed image block in the adjacent reference frame in the time domain, and predicts the initial loop filtering enabling probability (prob) of the to-be-processed image block based on the result of loop filtering of the reference image block.

In some embodiments, the ALF enabling status of nine adjacent reference image blocks CTUs on adjacent frames in the time domain can be statistically calculated to obtain the loop filtering enabling probability (prob) of the to-be-processed image block.

In step 704, the encoder determines whether the time domain level of the to-be-processed image block is greater than or equal to the preset level threshold th1. In some embodiments, the level threshold th1 can be set to the number of top-level time domain levels. If the encoder determines the time domain level of the to-be-processed image block is not greater than or equal to the preset level threshold th1, method 700 proceeds with step 706; if so, method 700 proceeds with step 708.

In step 706, the encoder determines whether the division depth of the to-be-processed image block is less than or equal to the preset second threshold th2. If so, method 700 proceeds to execute step 710; if not, method 700 proceeds to execute step 712. In some embodiments, the second threshold th2 can be set to 1. That is, the image to be processed is divided once.

In step 708, the encoder determines whether the coding bit number of the to-be-processed image block is less than the third threshold th3. If it is less than the third threshold th3, then the loop filtering enabling probability is updated to 0; otherwise, the loop filtering enabling probability is kept unchanged, and method 700 proceeds with step 714.

In step 710, the encoder determines whether the coding bit number of the to-be-processed image block is less than the fourth threshold th4. If it is less than the fourth threshold th4, then the loop filtering enabling probability is updated to 0; otherwise, the loop filtering enabling probability is kept unchanged, and method 700 proceeds with step 714.

In step 712, the encoder determines whether the coding bit number of the to-be-processed image block is less than the fifth threshold th5. If it is less than the fifth threshold th5, then the loop filtering enabling probability is kept unchanged; otherwise, the loop filtering enabling probability is updated to 1, and method 700 proceeds with step 714.

It should be noted that the third threshold th3, the fourth threshold th4 and the fifth threshold th5 may be the same or different, which are all within the protection scope of the present disclosure. In some embodiments, the third threshold th3, the fourth threshold th4 and the fifth threshold th5 are set to 100, that is, the threshold corresponding to the coding bit number corresponding to the to-be-processed image block is 100 bits.

In some embodiments, assuming the time domain level as the first level, the division depth as the second level, and the coding bit number as the third level, the loop filtering enabling probability can be updated through cascade comparison.

In step 714, the encoder makes a loop filtering decision for the to-be-processed image block for which the loop filtering enabling probability p is greater than the sixth threshold th6.

There can be a condition in the dotted box in the figure, through with the loop filtering enabling probability of the to-be-processed image block is determined, and proceed to step 714 based on the determined loop filtering enabling probability p.

For example, if the loop filtering enabling probability is not greater than the sixth threshold, then it is determined that the loop filtering is not to be performed, and the process can be ended.

In some embodiments, in order to weigh the acceleration ratio and performance loss, th6 can be set to 0.6.

For a specific method of making a loop filtering decision, reference may be made to some other embodiments herein, such as the description in conjunction with FIG. 5, which is not described again here.

Figure 8:
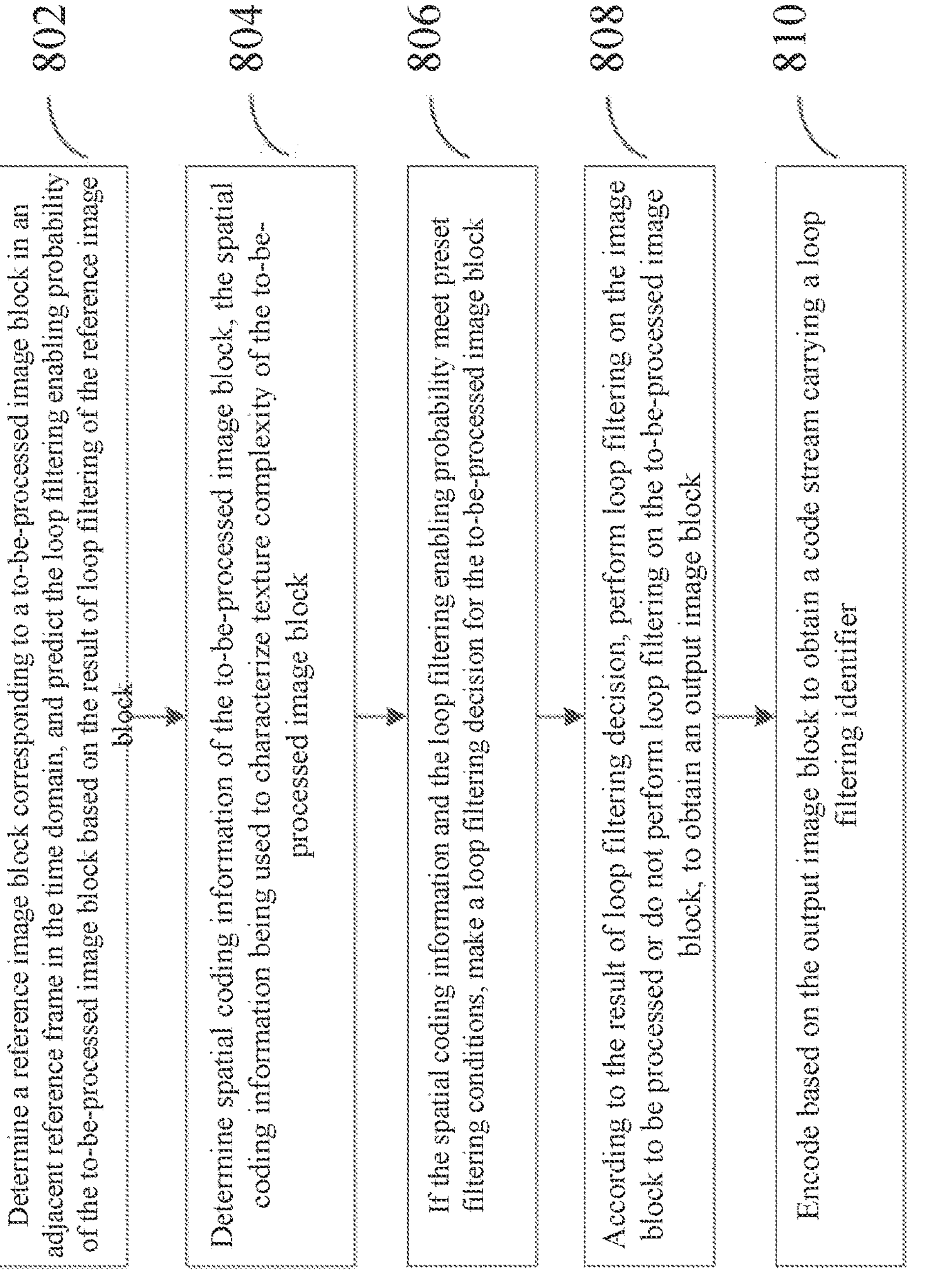
FIG. 8 is a flow chart illustrating steps of an exemplary encoding method according to some embodiments of the present disclosure.

FIG. 8 is a flow chart illustrating steps of an exemplary encoding method 800 according to some embodiments of the present disclosure. Specifically, encoding method 800 may include the following steps 802 to 810, which can be implemented by an encoder (e.g., image/video encoder 124 in FIG. 1 or apparatus 400 in FIG. 4).

In step 802, the encoder determines the reference image block corresponding to the to-be-processed image block in the adjacent reference frame in the time domain, and predicts the loop filtering enabling probability of the to-be-processed image block based on the result of loop filtering of the reference image block.

In step 804, the encoder determines the spatial coding information of the to-be-processed image block. The spatial coding information is used to characterize the texture complexity of the to-be-processed image block.

In step 806, the encoder makes the loop filtering decision for the to-be-processed image block if the spatial coding information and the loop filtering enabling probability meet the preset filtering conditions.

In step 808, the encoder performs loop filtering on the to-be-processed image block or the encoder does not perform loop filtering on the to-be-processed image block, according to the result of loop filtering decision, to obtain an output image block.

In step 810, the coder encodes based on the output image block to obtain a code stream carrying a loop filtering identifier.

For the specific implementation of various steps in some embodiments, reference may be made to the corresponding description of the corresponding steps and units in the foregoing method embodiments, and corresponding beneficial effects are provided, which will not be described again here. It is appreciated that for the convenience and simplicity of description, for the specific operating processes of the above-described devices and modules, reference may be made to the corresponding description of processes in the foregoing method embodiments, and description thereof will not be made again here.

In some embodiments, the spatial coding information can be used to characterize the texture complexity of the to-be-processed image block, and the loop filtering enabling probability obtained through the result of loop filtering of the reference image block in the time domain can be used to characterize the time domain filtering information of the image to be processed. By determining whether to make a loop filtering decision on the image to be processed through time domain information in combination with spatial information, the accuracy of the decision result can be improved. In addition, by setting the preset filtering conditions corresponding to the spatial coding information and the loop filtering enabling probability, some to-be-processed image blocks that don't need loop filtering can be filtered out based on the preset filtering conditions, thus reducing the computation complexity.

Some embodiments of the present disclosure provides a flow chart of steps of a decoding method. Specifically, the method provided by some embodiments includes the following steps: decoding a code stream and reconstructing a video frame to obtain a reconstructed block to be processed; and performing loop filtering on the reconstructed block based on the loop filtering identifier carried in the code stream, where the loop filtering identifier is determined by the encoding method provided in any of the above embodiments.

For the specific implementation of various steps in some embodiments, reference may be made to the corresponding description of the corresponding steps and units in the foregoing method embodiments, and corresponding beneficial effects are provided, which will not be described again here. It is appreciated that for the convenience and simplicity of description, for the specific operating processes of the above-described devices and modules, reference may be made to the corresponding description of processes in the foregoing method embodiments, and description thereof will not be made again here.

The loop filtering solution or encoding and decoding solution provided by any of the foregoing embodiments of the present disclosure can be performed by the video encoding end (encoder) when encoding the video stream to improve the processing efficiency of the encoding process. It can be applied to a variety of different scenarios, such as storage and streaming of conventional video games. Specifically, loop filtering can be performed on each image block in the video frame through the loop filtering solution provided by the embodiments of the present disclosure, and a loop filtering identifier is added in the generated video code stream for storage and transmission in video streaming services or other similar applications. Another example is low-latency scenarios such as video conferencing and live video broadcasting, specifically: conference video data can be captured by a video capture device, and then loop filtering can be performed on each image block in the video frame through the method provided by the embodiments of the present disclosure, and a loop filtering identifier is added in the generated video code stream, which is sent to the conference terminal. The conference terminal decodes the video code stream based on the loop filtering identifier to obtain the corresponding conference video picture. As yet another example, in a virtual reality scene, loop filtering can be performed on each image block in the video frame through the method provided by the embodiments of the present disclosure, and a loop filtering identifier is added in the generated video code stream, which is sent to the virtual reality related device (such as VR virtual glasses, etc.). The VR device decodes the video code stream based on the loop filtering identifier to obtain the corresponding video picture, and the corresponding VR function is implemented based on the video picture, etc.

Figure 9:
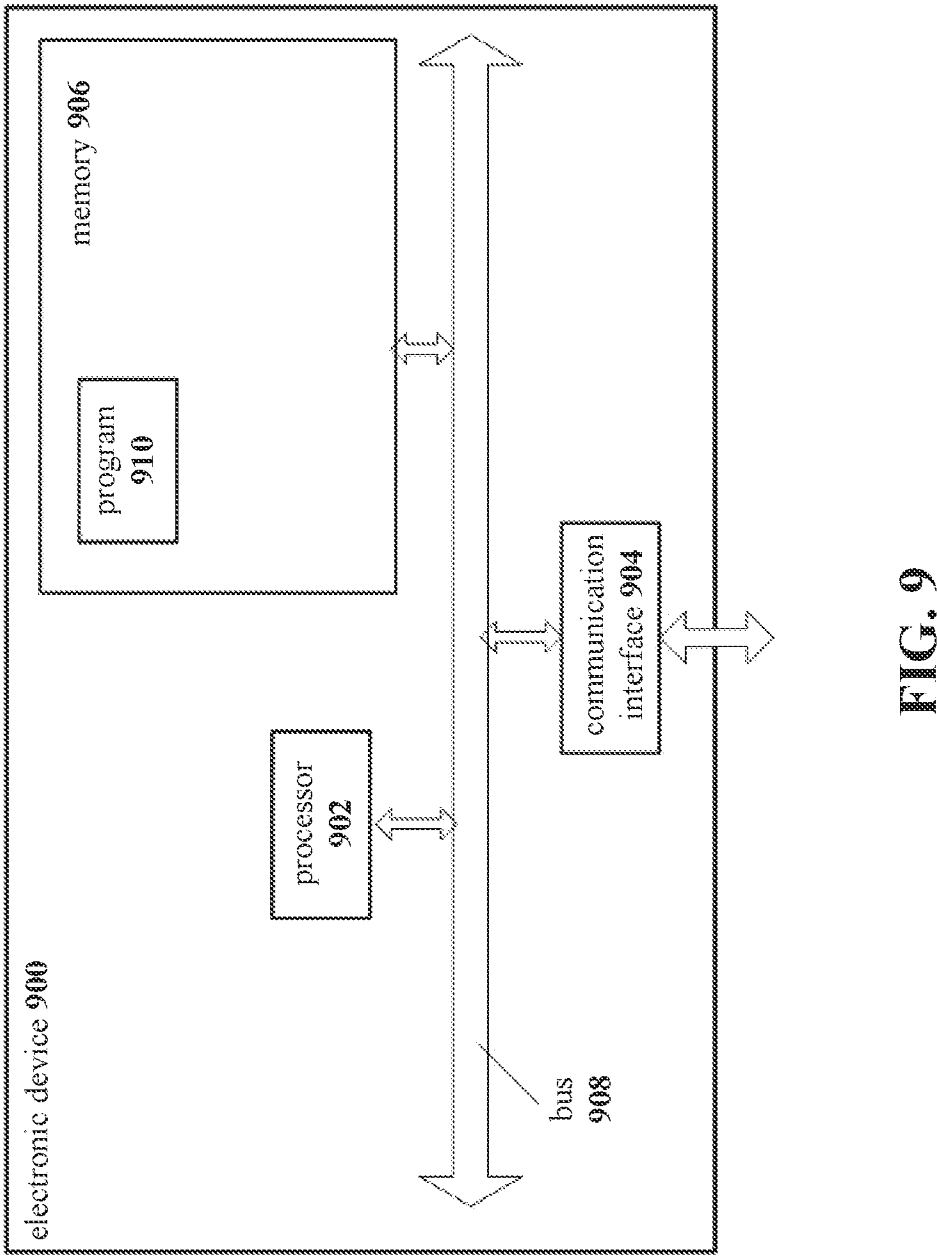
FIG. 9 is a schematic structural diagram illustrating an exemplary electronic device according to some embodiments of the present disclosure.

FIG. 9 is a schematic structural diagram illustrating an exemplary electronic device 900 according to some embodiments of the present disclosure. As shown in FIG. 9, electronic device 900 may include: a processor 902 (which can be one or more processors), a communication interface 904, a memory 906, and a communication bus 908.

Processor 902, communication interface 904, and memory 906 communicate with each other through communication bus 908.

Communication interface 904 is configured for communication with other electronic devices or servers.

Processor 902 is configured to execute program 910. Specifically, it can execute relevant steps in the above-mentioned embodiments of the loop filtering method or encoding and decoding method.

Specifically, program 910 may include a program code that includes computer operation instructions.

Processor 902 may be a CPU, a graphics processing unit (GPU), an infrastructure processing unit (IPU), a neural processing unit (NPU), or an Application Specific Integrated Circuit (ASIC), or one or more integrated circuits configured to implement embodiments of the present disclosure. The one or more processors included in a smart device may be the same type of processor, such as one or more CPUs; or they may be different types of processors, such as one or more CPUs and one or more ASICs.

Memory 906 is configured to store a program 910. Memory 906 may include a high-speed random access memory (RAM), and may also include a non-volatile memory, such as at least one disk memory.

Program 910 may include multiple computer instructions. Specifically, program 910 may use the multiple computer instructions to cause processor 902 to perform operations corresponding to the loop filtering method or encoding and decoding method described in any of the foregoing method embodiments.

For each step in program 910, reference may be made to the corresponding description of the corresponding steps and units in the foregoing method embodiments, and corresponding beneficial effects are provided, which will not be described again here. It is appreciated that for the convenience and simplicity of description, for the specific operating processes of the above-described devices and modules, reference may be made to the corresponding description of processes in the foregoing method embodiments, and is not described here again.

Some embodiments of the present disclosure further provide a non-transitory computer-readable storage medium having a computer program stored thereon which, when executed by a processor, implements the method described in any of the methods described above. The computer storage medium includes but is not limited to: Compact Disc Read-Only Memory (CD-ROM), Random Access Memory (RAM), floppy disk, hard disk or magneto-optical disk, etc.

Some embodiments of the present disclosure further provide a computer program product including computer instructions. The computer instructions instruct the computing device to perform operations corresponding to any method in the foregoing method embodiments.

In addition, it should be noted that the user-related information (including but not limited to user device information, user personal information, etc.) and data (including but not limited to sample data to train the model, data for analysis, stored data, displayed data, etc.) involved in the embodiments of the present disclosure are all information and data authorized by the user or fully authorized by all parties, and the collection, use and processing of relevant data need to comply with the relevant laws and regulations and standards of relevant countries and regions, and corresponding operation entrances are provided for users to choose to authorize or reject.

It should be noted that according to the needs of implementation, each component/step described in the embodiments of the present disclosure can be split into more components/steps, or two or more components/steps or some operations of components/steps can be combined into new components/steps to achieve the purpose of the embodiments of the present disclosure.

The foregoing methods according to the embodiments of the present disclosure can be implemented in hardware, firmware, or as software or computer code that can be stored in a recording medium (such as CD-ROM, RAM, floppy disk, hard disk or magneto-optical disk), or implemented as computer codes downloaded over a network that are originally stored in a remote recording medium or non-transitory machine-readable medium and will be stored in a local recording medium, so that the method described herein can be processed by such a software stored on a recording medium using a general-purpose computer, a dedicated processor or programmable or dedicated hardware such as an Application Specific Integrated Circuit (ASIC) or a Field Programmable Gate Array (FPGA). It can be understood that a computer, processor, microprocessor controller or programmable hardware includes a storage component (such as, Random Access Memory (RAM), Read-Only Memory (ROM), flash memory) that can store or receive software or computer codes. When the software or computer codes are accessed and executed by a computer, processor or hardware, the methods described herein are implemented. Furthermore, when a general-purpose computer accesses code for implementing the methods illustrated herein, execution of the code converts the general-purpose computer into a special-purpose computer for performing the methods illustrated herein.

The embodiments may further be described using the following clauses:

1. A loop filtering method, comprising:
determining a reference image block corresponding to a to-be-processed image block in an adjacent reference frame in a time domain, and predicting a loop filtering enabling probability of the to-be-processed image block based on a result of loop filtering of the reference image block;
determining spatial coding information of the to-be-processed image block, the spatial coding information being used to characterize texture complexity of the to-be-processed image block; and
making a loop filtering decision for the to-be-processed image block in response to the spatial coding information and the loop filtering enabling probability meeting preset filtering conditions.

2. The method according to clause 1, wherein making the loop filtering decision for the to-be-processed image block in response to the spatial coding information and the loop filtering enabling probability meeting preset filtering conditions comprises:
updating the loop filtering enabling probability based on the spatial coding information; and
making the loop filtering decision for the to-be-processed image block in response to the updated loop filtering enabling probability meeting a preset probability condition; or
determining not to perform loop filtering on the to-be-processed image block in response to the updated loop filtering enabling probability does not meet the preset probability condition.

3. The method according to clause 2, wherein updating the loop filtering enabling probability based on the spatial coding information comprises:
updating the loop filtering enabling probability based on a time domain level of a video frame where the to-be-processed image block is located and the spatial coding information.

4. The method according to clause 2, wherein updating the loop filtering enabling probability based on the spatial coding information comprises:
inputting the spatial coding information and the loop filtering enabling probability to a pre-trained machine learning model, and outputting the updated loop filtering enabling probability through the machine learning model.

5. The method according to clause 2, wherein the spatial coding information comprises at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, or image gradient information of the reference block adjacent to the to-be-processed image block in the space domain.

6. The method according to clause 5, wherein if the spatial coding information comprises at least two types, then updating the loop filtering enabling probability based on the spatial coding information comprises:
performing cascade comparison based on preset parameter thresholds corresponding to the at least two types of spatial coding information; and
updating the loop filtering enabling probability based on the result of cascade comparison.

7. An encoding method, comprising:
determining a reference image block corresponding to a to-be-processed image block in an adjacent reference frame in a time domain, and predicting a loop filtering enabling probability of the to-be-processed image block based on a result of loop filtering of the reference image block;
determining spatial coding information of the to-be-processed image block, the spatial coding information being used to characterize texture complexity of the to-be-processed image block; and
making a loop filtering decision for the to-be-processed image block in response to the spatial coding information and the loop filtering enabling probability meeting preset filtering conditions;
performing loop filtering on the to-be-processed image block or not performing loop filtering on the to-be-processed image block according to the result of loop filtering decision, to obtain an output image block; and
encoding based on the output image block to obtain a code stream carrying a loop filtering identifier.

8. The method according to clause 7, wherein making the loop filtering decision for the to-be-processed image block in response to the spatial coding information and the loop filtering enabling probability meeting preset filtering conditions comprises:
updating the loop filtering enabling probability based on the spatial coding information; and
making the loop filtering decision for the to-be-processed image block in response to the updated loop filtering enabling probability meeting a preset probability condition; or
determining not to perform loop filtering on the to-be-processed image block in response to the updated loop filtering enabling probability does not meet the preset probability condition.

9. The method according to clause 8, wherein updating the loop filtering enabling probability based on the spatial coding information comprises:
updating the loop filtering enabling probability based on a time domain level of a video frame where the to-be-processed image block is located and the spatial coding information.

10. The method according to clause 8, wherein updating the loop filtering enabling probability based on the spatial coding information comprises:
inputting the spatial coding information and the loop filtering enabling probability to a pre-trained machine learning model, and outputting the updated loop filtering enabling probability through the machine learning model.

11. The method according to clause 8, wherein the spatial coding information comprises at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, or image gradient information of the reference block adjacent to the to-be-processed image block in the space domain.

12. The method according to clause 11, wherein if the spatial coding information comprises at least two types, then updating the loop filtering enabling probability based on the spatial coding information comprises:

performing cascade comparison based on preset parameter thresholds corresponding to the at least two types of spatial coding information; and updating the loop filtering enabling probability based on the result of cascade comparison.

13. A decoding method, comprising:

decoding a code stream and reconstructing a video frame to obtain a reconstructed block to be processed; and performing loop filtering on the reconstructed block based on a loop filtering identifier carried in the code stream, wherein the loop filtering identifier is determined by the encoding method according to any of claims 7-12.

14. An electronic device, comprising: one or more processors, a memory, a communication interface, and a communication bus, where the one or more processors, the memory, and the communication interface communicate with each other via the communication bus; and the memory is configured to store instructions that are executable by the one or more processors to causes the electronic device to perform the method according to any of claims 1-13.

15. A non-transitory computer-readable storage medium, storing instructions that are executable by one or more processors of a device to cause the device to perform the method according to any of claims 1-13.

It is appreciated that the units and method steps of each example described in conjunction with the embodiments disclosed herein can be implemented in electronic hardware, or a combination of computer software and electronic hardware. Whether these functions are performed in hardware or software depends on the specific application and design constraints of the technical solution. Professionals and technicians may use different methods to implement the described functions for each specific application, but such implementations should not be considered beyond the scope of the embodiments of the present disclosure.

It is to be noted that, the terms such as "first" and "second" in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms "include", "have" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is to be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution described in some embodiments of the present disclosure.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A loop filtering method, comprising:

determining a reference image block corresponding to a to-be-processed image block in an adjacent reference frame in a time domain, and predicting a loop filtering enabling probability of the to-be-processed image block based on a result of loop filtering of the reference image block;

determining spatial coding information of the to-be-processed image block, the spatial coding information being used to characterize texture complexity of the to-be-processed image block; and making a loop filtering decision for the to-be-processed image block in response to the spatial coding information and the loop filtering enabling probability meeting preset filtering conditions.

2. The method according to claim 1, wherein making the loop filtering decision for the to-be-processed image block in response to the spatial coding information and the loop filtering enabling probability meeting preset filtering conditions comprises:

updating the loop filtering enabling probability based on the spatial coding information; and making the loop filtering decision for the to-be-processed image block in response to the updated loop filtering enabling probability meeting a preset probability condition; or determining not to perform loop filtering on the to-be-processed image block in response to the updated loop filtering enabling probability does not meet the preset probability condition.

3. The method according to claim 2, wherein updating the loop filtering enabling probability based on the spatial coding information comprises:

updating the loop filtering enabling probability based on a time domain level of a video frame where the to-be-processed image block is located and the spatial coding information.

4. The method according to claim 2, wherein updating the loop filtering enabling probability based on the spatial coding information comprises:

inputting the spatial coding information and the loop filtering enabling probability to a pre-trained machine learning model, and outputting the updated loop filtering enabling probability through the machine learning model.

5. The method according to claim 2, wherein the spatial coding information comprises at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, or image gradient information of the reference block adjacent to the to-be-processed image block in the space domain.

6. The method according to claim 5, wherein if the spatial coding information comprises at least two types, then updating the loop filtering enabling probability based on the spatial coding information comprises:

performing cascade comparison based on preset parameter thresholds corresponding to the at least two types of spatial coding information; and updating the loop filtering enabling probability based on the result of cascade comparison.

7. An electronic device, comprising: one or more processors, a memory, a communication interface, and a communication bus, where the processor, the memory, and the communication interface communicate with each other via the communication bus; and the memory is configured to store instructions that are executable by the one or more processors to causes the electronic device to perform operations comprising:

determining a reference image block corresponding to a to-be-processed image block in an adjacent reference frame in a time domain, and predicting a loop filtering enabling probability of the to-be-processed image block based on a result of loop filtering of the reference image block;

determining spatial coding information of the to-be-processed image block, the spatial coding information being used to characterize texture complexity of the to-be-processed image block; and making a loop filtering decision for the to-be-processed image block in response to the spatial coding information and the loop filtering enabling probability meeting preset filtering conditions.

8. The device according to claim 7, wherein making the loop filtering decision for the to-be-processed image block in response to the spatial coding information and the loop filtering enabling probability meeting preset filtering conditions comprises:

updating the loop filtering enabling probability based on the spatial coding information; and making the loop filtering decision for the to-be-processed image block in response to the updated loop filtering enabling probability meeting a preset probability condition; and determining not to perform loop filtering on the to-be-processed image block in response to the updated loop filtering enabling probability does not meet the preset probability condition.

9. The device according to claim 8, wherein updating the loop filtering enabling probability based on the spatial coding information comprises:

updating the loop filtering enabling probability based on a time domain level of a video frame where the to-be-processed image block is located and the spatial coding information.

10. The device according to claim 8, wherein updating the loop filtering enabling probability based on the spatial coding information comprises:

inputting the spatial coding information and the loop filtering enabling probability to a pre-trained machine learning model, and outputting the updated loop filtering enabling probability through the machine learning model.

11. The device according to claim 8, wherein the spatial coding information comprises at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, or image gradient information of the reference block adjacent to the to-be-processed image block in the space domain.

12. The device according to claim 11, wherein if the spatial coding information comprises at least two types, then updating the loop filtering enabling probability based on the spatial coding information comprises:

performing cascade comparison based on preset parameter thresholds corresponding to the at least two types of spatial coding information; and updating the loop filtering enabling probability based on the result of cascade comparison.

13. A non-transitory computer-readable storage medium, storing instructions that are executable by one or more processors of a device to cause the device to perform operations for loop filtering, the operations comprising:

determining a reference image block corresponding to a to-be-processed image block in an adjacent reference frame in a time domain, and predicting a loop filtering enabling probability of the to-be-processed image block based on a result of loop filtering of the reference image block;

determining spatial coding information of the to-be-processed image block, the spatial coding information being used to characterize texture complexity of the to-be-processed image block; and making a loop filtering decision for the to-be-processed image block in response to the spatial coding information and the loop filtering enabling probability meeting preset filtering conditions.

14. The non-transitory computer-readable storage medium according to claim 13, wherein making the loop filtering decision for the to-be-processed image block in response to the spatial coding information and the loop filtering enabling probability meeting preset filtering conditions comprises:

updating the loop filtering enabling probability based on the spatial coding information; and making the loop filtering decision for the to-be-processed image block in response to the updated loop filtering enabling probability meeting a preset probability condition; and determining not to perform loop filtering on the to-be-processed image block in response to the updated loop filtering enabling probability does not meet the preset probability condition.

15. The non-transitory computer-readable storage medium according to claim 14, wherein updating the loop filtering enabling probability based on the spatial coding information comprises:

updating the loop filtering enabling probability based on a time domain level of a video frame where the to-be-processed image block is located and the spatial coding information.

16. The non-transitory computer-readable storage medium according to claim 14, wherein updating the loop filtering enabling probability based on the spatial coding information comprises:

inputting the spatial coding information and the loop filtering enabling probability to a pre-trained machine learning model, and outputting the updated loop filtering enabling probability through the machine learning model.

17. The non-transitory computer-readable storage medium according to claim 14, wherein the spatial coding information comprises at least one of: division depth of the to-be-processed image block, coding bit number of the to-be-processed image block, boundary strength information of the to-be-processed image block, image gradient information of the to-be-processed image block, boundary strength information of the reference block adjacent to the to-be-processed image block in a space domain, or image gradient information of the reference block adjacent to the to-be-processed image block in the space domain.

18. The non-transitory computer-readable storage medium according to claim 17, wherein if the spatial coding information comprises at least two types, then updating the loop filtering enabling probability based on the spatial coding information comprises:

performing cascade comparison based on preset parameter thresholds corresponding to the at least two types of spatial coding information; and updating the loop filtering enabling probability based on the result of cascade comparison.

* * * * *